(12) United States Patent
Jandhyala et al.

(10) Patent No.: US 10,364,643 B2
(45) Date of Patent: *Jul. 30, 2019

(54) METHODS FOR FORMULATING A CEMENT SLURRY FOR USE IN A SUBTERRANEAN SALT FORMATION USING GEOMETRIC MODELING

(71) Applicant: Halliburton Energy Services, Inc., Houston, TX (US)

(72) Inventors: Siva Rama Krishna Jandhyala, Pune (IN); Krishna M. Ravi, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/809,967

(22) Filed: Nov. 10, 2017

(65) Prior Publication Data
US 2018/0087377 A1    Mar. 29, 2018

Related U.S. Application Data

(63) Continuation of application No. 15/300,098, filed as application No. PCT/US2015/019677 on Mar. 10, (Continued)

(51) Int. Cl.
*E21B 33/14* (2006.01)
*C04B 7/36* (2006.01)
(Continued)

(52) U.S. Cl.
CPC ............. *E21B 33/14* (2013.01); *C04B 7/361* (2013.01); *C09K 8/40* (2013.01); *C09K 8/42* (2013.01);
(Continued)

(58) Field of Classification Search
CPC ..... C04B 28/08; C04B 2103/40; C04B 7/361; E21B 33/13; E21B 33/14; E21B 49/00;
(Continued)

(56) References Cited

U.S. PATENT DOCUMENTS

| | | |
|---|---|---|
| 5,006,177 A | 4/1991 | Oberste-Padtberg |
| 5,309,999 A | 5/1994 | Cowan et al. |

(Continued)

FOREIGN PATENT DOCUMENTS

| | | |
|---|---|---|
| WO | WO-2011/042705 A1 | 4/2011 |
| WO | WO-2014052182 A1 | 4/2014 |

(Continued)

OTHER PUBLICATIONS

Danish Office Action from Danish Patent Application No. PA 2016 00508, dated Dec. 8, 2017, 7 pages.

(Continued)

*Primary Examiner* — Zakiya W Bates
(74) *Attorney, Agent, or Firm* — Thomas Rooney; C. Tumey Law Group PLLC

(57) ABSTRACT

Methods including experimentally determining a salt creep profile for a single salt or intercalated salts in a subterranean formation, designing a proposed cement slurry based on the salt creep profile, experimentally determining whether the proposed cement slurry is capable of forming a wellbore load resistant cement sheath based on actual thermal and thermo-mechanical properties of the proposed cement slurry, theoretically determining whether the proposed cement slurry is capable of forming the wellbore load resistant cement sheath by designing an electronic, cross-section geometric model of the subterranean salt formation and simulating a condition of the wellbore loads on the cured proposed cement slurry using the geometric model, establishing a final cement slurry capable of forming the wellbore (Continued)

load resistant cement sheath, and performing a final cementing operation with the final cement slurry in the subterranean salt formation.

20 Claims, 5 Drawing Sheets

Related U.S. Application Data 2015, now Pat. No. 9,822,639, which is a continuation-in-part of application No. PCT/US2014/040245, filed on May 30, 2014.

(51) Int. Cl.
| | |
|---|---|
| *C09K 8/42* | (2006.01) |
| *E21B 33/13* | (2006.01) |
| *G01V 1/40* | (2006.01) |
| *C09K 8/40* | (2006.01) |
| *E21B 49/00* | (2006.01) |
| *G06F 9/455* | (2018.01) |
| *E21B 47/08* | (2012.01) |

(52) U.S. Cl.
CPC ............ *E21B 33/13* (2013.01); *E21B 49/003* (2013.01); *G01V 1/40* (2013.01); *G06F 9/455* (2013.01); *E21B 47/08* (2013.01); *E21B 49/00* (2013.01)

(58) Field of Classification Search
CPC . C09K 8/42; C09K 8/46; C09K 8/487; C09K 8/516
See application file for complete search history.

(56) References Cited

U.S. PATENT DOCUMENTS

| | | | |
|---|---|---|---|
| 6,626,243 | B1 | 9/2003 | Go Boncan |
| 6,675,895 | B1 | 1/2004 | Shehab et al. |
| 7,552,648 | B2 | 6/2009 | McMechan et al. |
| 7,913,757 | B2 | 3/2011 | Reddy et al. |
| 9,822,639 | B2 * | 11/2017 | Jandhyala ............... C09K 8/42 |
| 2007/0209796 | A1 | 9/2007 | Santra et al. |
| 2012/0018154 | A1 | 1/2012 | James |
| 2012/0298358 | A1 | 11/2012 | Iverson et al. |
| 2015/0101397 | A1 | 4/2015 | Poiate Junior et al. |
| 2016/0258246 | A1 | 9/2016 | Jandhyala et al. |

FOREIGN PATENT DOCUMENTS

| | | |
|---|---|---|
| WO | WO-2014070503 A1 | 5/2014 |
| WO | WO-2015183307 A | 12/2015 |
| WO | WO-2015183372 A1 | 12/2015 |

OTHER PUBLICATIONS

ANSI/API Recommended Practice 10B-2 (Formerly 10B), First Edition, Jul. 2005.
ASTM Designation: C1608—12, Standard Test Method for Chemical Shrinkage of Hydraulic Cement Paste, 2012.
ASTM Designation: C307—03 (Reapproved 2012) Standard Test Method for Tensile Strength of Chemical-Resistant Mortar, Grouts, arid Monolithic Surfacings, 2012.
ASTM Designation: C470/0470M—09, Standard Specification for Molds for Forming Concrete Test Cylinders Vertically, 2009.
ASTM Designation: D 2664-95a, Standard Test Method for Triaxial Compressive Strength of Undrained Rock Core Specimens Without Pore Pressure Measurements, 1995.
ASTM Designation: D 3148-02, Standard Test Method for Elastic Moduli of Intact Rock Core Specimines in Uniaxial Compression, 2002.
Dawson, Paul R., Constitutive Models Applied in the Analysis of Creep Rock Salt, SAND-0137 (Apr. 1979).
Folsta et al., "Predicting Salt Leaching During Drilling and Cementing Operations," SPE/IADC Drilling Conference and Exhibition held in Amsterdam, The Netherlands, Mar. 1-3, 2011, SPE/IADC 140242.
Gomez et al., "Cement Zonal Isolation to Control Salt and $CO_2$ in Brazilian Ultra Deep Water Presalt Well of Santos Basin," Brasil Offshore Conference and Exhibition held in Macae, Brazil, Jun. 14-17, 2011, SPE 143772.
International Search Report and Written Opinion for PCT/US2014/040245 dated Feb. 25, 2015.
International Search Report for PCT/US2015/019677 dated Jun. 11, 2015.
Jandyhala et al., "Cement Sheath Integrity in Fast Creeping Salts: Effect of Well Operations," SPE Offshore Europe Oil and Gas Conference and Exhibition held in Aberdeen, UK, Sep. 3-6, 2013, SPE 166622.
PUC-Rico, Certificate Digital No. 1012301/CA, "Salt Creep Theory", not dated.
Simao et al., "Sementing in Front of Soluble Salt Zones," SPE Deepwater Drilling and Sompletions Conference held in Galveston, TX, Jun. 20-21, 2012, SPE 145719.
Website—Chandler Engineering "Model 4265 Ultrasonic Cement Analyzer" 2011.

* cited by examiner

METHODS FOR FORMULATING A CEMENT SLURRY FOR USE IN A SUBTERRANEAN SALT FORMATION USING GEOMETRIC MODELING

CROSS-REFERENCE TO RELATED APPLICATIONS

This application is a continuation application of U.S. application Ser. No. 15/300,098, entitled "Methods for Formulating a Cement Slurry for Use in a Subterranean Salt Formation Using Geometric Modeling", filed Sep. 28, 2016, which is a national stage application of PCT/US2015/019677 entitled "Methods for Formulating a Cement Slurry for Use in a Subterranean Salt Formation Using Geometric Modeling," filed Mar. 10, 2015, which is a continuation-in-part of International Application No. PCT/US2014/040245, entitled "Methods for Formulating a Cement Slurry for Use in a Subterranean Salt Formation", filed May 30, 2014, each of which is hereby incorporated by reference in its entirety for all purposes.

BACKGROUND

The embodiments herein relate to methods for formulating a cement slurry for use in a subterranean salt formation, and, more particularly, to methods for formulating a cement slurry in a subterranean salt formation comprising single and intercalated salts using geometric modeling.

Subterranean formation operations (e.g., stimulation operations, sand control operations, completion operations, etc.) often involve drilling a wellbore in a subterranean formation with a drilling fluid (and thereafter placing a cement sheath between the formation and a casing (or liner string) in the wellbore. The cement sheath is formed by pumping a cement slurry through the bottom of the casing and out through an annulus between the outer casing wall and the formation face of the wellbore, or by directly pumping a cement slurry into the annulus. The cement slurry then cures in the annular space, thereby forming a sheath of hardened cement that, inter alia, supports and positions the casing in the wellbore and bonds the exterior surface of the casing to the subterranean formation. This process is referred to as "primary cementing." Among other things, the cement sheath may keep fresh water reservoirs from becoming contaminated with produced fluids from within the wellbore. As used herein, the term "fluid" refers to liquid phase fluids and gas phase fluids. The cement sheath may also prevent unstable formations from caving in, thereby reducing the chance of a casing collapse and/or stuck drill pipe. Finally, the cement sheath forms a solid barrier to prevent fluid loss or contamination of production zones. The degree of success of a subterranean formation operation involving placement of a cement sheath, therefore, depends, at least in part, upon the successful cementing of the wellbore casing and the cement's ability to maintain zonal isolation of the wellbore.

Formations below the subterranean salt formations are often rich in hydrocarbons or other desirable fluids for production to the surface. Thus, drilling and cementing wellbores in such subterranean salt formations is often performed to reach such zones and produce the hydrocarbons to the surface. As used herein, the term "subterranean salt formation" (or simply "salt formation") refers to a rock formation composed substantially of salt. A variety of salts may be found in a salt formation including, but not limited to, halite, sylvite, bischofite, carnallite, polyhalite, tachyhydrite, anhydrite, and the like, and any combination thereof. However, drilling and cementing in such salt formations may be problematic due to salt creep, for example. As used herein, the term "salt creep" refers to the phenomenon of salt in a formation under stress to deform significantly as a function of time, depending on the loading conditions, and its physical properties, which permits the salt to flow into the wellbore and replace the volume of formation removed by the drill bit. Such replacement may reduce the size of the wellbore and/or may cause the drill pipe to stick and eventually force abandonment of the well. Additionally, during drilling, a drilling fluid may be circulated to and from a wellbore and salt from the formation may become dissolved in the drilling fluid, resulting in, among other things, wellbore opening (i.e., an increase in the radius/diameter of the wellbore), changes in the rheology of the drilling fluid, and the like.

During cementing, the cement slurry may interact with and dissolve at least a portion of the salts in the salt formation, thereby affecting the hydration properties and final cured properties of a cement slurry. For example, dissolution of salt in the cement slurry may influence such cement properties as, without limitation, free fluid, thickening time, compressive strength, rheological properties, and the like. In some cases, the influence of the salt dissolution by changing the geometry of the wellbore and the cement slurry properties may be particularly detrimental and may result in the failure of zonal isolation in a wellbore (e.g., by reducing the wellbore radius and through fluid invasion or other loss of structural integrity to the hydrating or cured cement). Failure of zonal isolation, among other things, may result in environmental contamination, which may cause harm to both flora and fauna, including humans. Such failure may further prevent production or reduce the production capability of a wellbore, which may result in abandonment of the wellbore or costly and time-consuming remedial actions.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1:
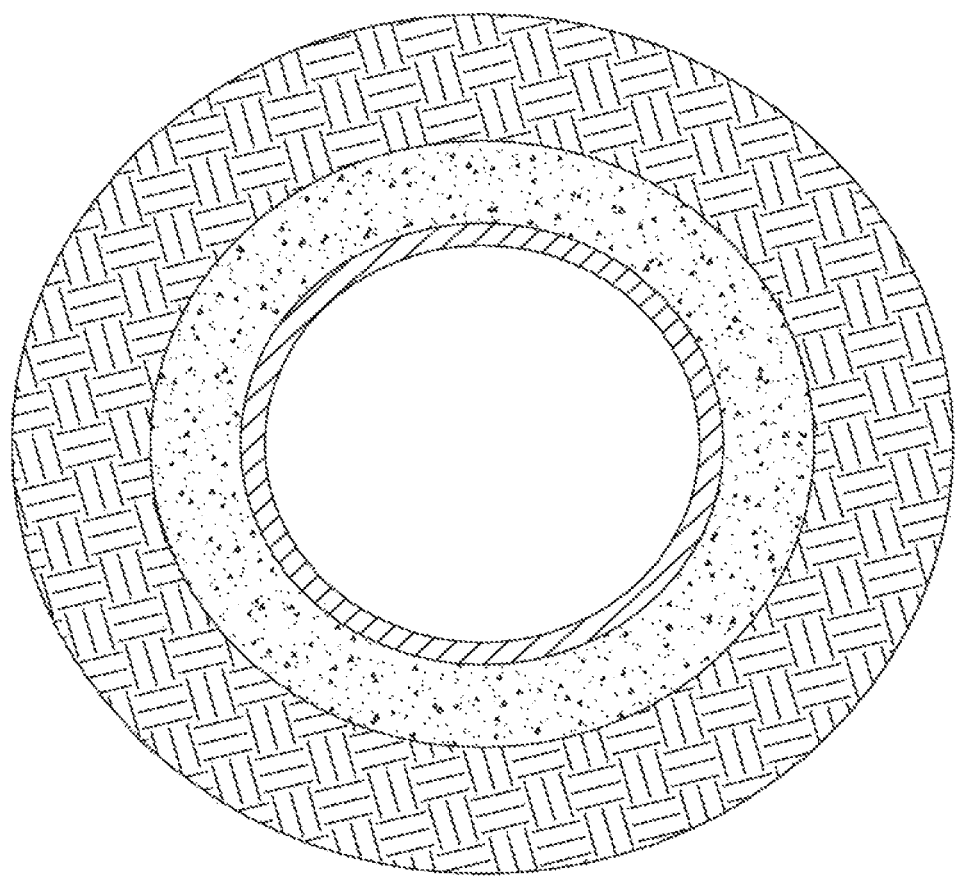
FIG. 1 illustrates a representation of an electronic, cross-section geometric model at a location comprising a single salt, according to one or more embodiments of the present disclosure.

The embodiments herein relate to methods for formulating a cement slurry for use in a subterranean salt formation, and, more particularly, to methods for formulating a cement in a subterranean salt formation comprising single and intercalated salts using geometric modeling.

The methods described in the embodiments of the present disclosure permit an operator to determine whether a particular cement slurry formulation may be used in a particular subterranean salt formation to form a cement sheath. Generally, the methods of the present disclosure optimize cement sheath mechanical properties for cementing single and intercalated salt zones in a wellbore in a subterranean salt formation using customized geometric modeling and analysis of the wellbore construction process, such that the optimized cement sheath is capable of maintaining mechanical integrity for the life of the wellbore under planned wellbore loadings, including salt creep loads of the one or more salts adjacent to the cement sheath.

The methods described herein may take into account specific salt creep profiles, wellbore loads (e.g., natural loads, operational loads, salt creep loads, and the like), and the like. More specifically, the methods described herein may take into account the presence of a single salt or intercalated salt layers. As used herein, the term "intercalated salt" refers to at least two salt layers, which may abut one another or comprise one or more layers of a geological formation material therebetween or adjacent thereto (e.g., mineral or rock layers). Accordingly, the methods described herein take into account the varying wellbore loads that may be present at a location or along a length of a wellbore where a single salt, intercalated salt layers, and/or any geological material layers therebetween or flanking such single or intercalated salt layers, in which each exerts different wellbore load pressures on a hydrating or cured cement sheath. As used herein, the term "hydrating" or "hydration" refers to the process of a cement reaction with water as it proceeds to its cured state, but before final curing. As used herein, the term "cure" or "cured" refers to cement that has set, hardened, and completed substantially its reaction with water.

Accordingly, and as discussed in detail below, based on the results of a salt creep profile and various wellbore loads, the methods of the present disclosure utilize an electronic geometric model to simulate the integrity of the cement sheath to withstand such loads. The geometric model beneficially may take into account a single salt (e.g., a single salt layer) or intercalated salts, including any intercalated geological formation materials, to simulate the effect of the wellbore loads at various locations at a location or along a length of a wellbore due to differing physical wellbore loads and differing physical locations. The cement slurry may be manipulated one or more times and re-evaluated to ensure that it is appropriate for the particular subterranean salt formation and any subterranean formation operations to be performed therein (e.g., drilling, stimulation, production, and the like). Once an adequate cement slurry has been designed for use in the subterranean salt formation, a cementing operation may be performed with knowledge that the cement slurry will provide long-term zonal isolation.

One or more illustrative embodiments disclosed herein are presented below. Not all features of an actual implementation are described or shown in this application for the sake of clarity. It is understood that in the development of an actual embodiment incorporating the embodiments disclosed herein, numerous implementation-specific decisions must be made to achieve the developer's goals, such as compliance with system-related, lithology-related, business-related, government-related, and other constraints, which vary by implementation and from time to time. While a developer's efforts might be complex and time-consuming, such efforts would be, nevertheless, a routine undertaking for those of ordinary skill in the art having benefit of this disclosure.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, amounts of time, and so forth used in the present specification and associated claims are to be understood as being modified in all instances by the term "about." As used herein, the term "about" encompasses +/−5% of a numerical value. Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

While compositions and methods are described herein in terms of "comprising" various components or steps, the compositions and methods can also "consist essentially of" or "consist of" the various components and steps. When "comprising" is used in a claim, it is open-ended.

As used herein, the term "substantially" means largely, but not necessarily wholly.

The methods described in the present disclosure generally employ a four step methodology, which is not presented sequentially as the sequence may vary, involving (1) characterizing the subterranean salt formation into which a cement sheath is to be placed, (2) designing a cement slurry and testing for its thermal and thereto-mechanical properties, (3) modeling a well construction process by constructing a geometric wellbore model and representing wellbore loads expected to be exerted on the wellbore mathematically (and in sequence) taking into account the formation, cured cement sheath, and casing, and (4) performing a structural analysis of the casing-cement-formation (i.e., taking into account each component in a wellbore including the formation, the casing, and the cement for a particular cementing operation) to determine the structural and mechanical integrity of the cement sheath.

In some embodiments, the methods described herein include providing a wellbore in a subterranean salt formation comprising a single salt at a first location in the salt formation. That is, in some embodiments, only a single salt at a particular location in the salt formation may be analyzed for forming a suitable cement sheath in accordance with the embodiments described herein. In other embodiments, the methods described herein include providing a wellbore in a subterranean salt formation comprising intercalated salts at a first length in the salt formation. That is, in some embodiments, multiple salt layers spanning a particular length of the wellbore may be analyzed for forming a suitable cement sheath in accordance with the embodiments described herein, with or without geological material therebetween or abutting such intercalated salts.

A salt creep profile for either the single salt at the first location or the intercalated salt at the first length of the subterranean formation may then be experimentally determined. As used herein, the term "salt creep profile" refers to the salt creep loads placed on an adjacent structure from salt in a subterranean formation. In the embodiments herein, the structure adjacent to the salt in the formation may be hydrating and cured cement for use in forming a cement sheath, and my further be casing adjacent to the cement sheath. The salt creep profile may be determined by any method that quantifies the salt creep load.

In some embodiments, the salt creep profile may be experimentally determined by obtaining one or more wellbore core samples of the wellbore in the subterranean salt formation (e.g., at at least the first location for the single salt, or at at least the first length for the intercalated salts). Without limitation, multiple wellbore core samples may be taken at varying locations or lengths along the wellbore, without departing from the scope of the present disclosure. Moreover, the wellbore core sample may comprise not only the single salt or intercalated salts of interest, but also geological formation material (e.g., geological formation material between or abutting the single or intercalated salts), without departing from the scope of the present disclosure. Thereafter, a core sample salt creep load measurement may be performed to acquire the salt creep profiled.

In other embodiments, the salt creep profile may be experimentally determined by taking a downhole salt creep load measurement within the wellbore in the subterranean salt formation (i.e., without taking a physical core sample, but within the physical wellbore) at one or more wellbore locations or lengths (e.g., at at least the first location for the single salt, or at at least the first length for the intercalated salts). For example, the downhole salt creep load measurement may evaluate wellbore radius closure rates due to salt creep with drilling mud or another treatment fluid within the wellbore. Such downhole salt creep load measurements may be taken by any suitable downhole tool including, but not limited to, wellbore logs, such as caliper logs, and the like that can measure wellbore size.

In yet other embodiments, the salt creep profile of the subterranean salt formation of interest at one or more locations or lengths thereof (e.g., at at least the first location for the single salt, or at at least the first length for the intercalated salts) may be experimentally determined by obtaining an offset well salt creep load measurement, without taking either a physical sample or a physical measurement of the subterranean salt formation. As used herein, the term "offset well" refers to an existing wellbore close in proximity to a proposed well that provides information for planning the proposed well. In some embodiments, the offset well is in the same oil field as the subterranean salt formation of interest. As used herein, the term "oil field" refers to the surface area above a subsurface oil accumulation. Thereafter, parametric analysis may be performed on the offset well salt creep load measurement to obtain the salt creep profile for the subterranean salt formation of interest. Parametric analysis may be performed to adjust for certain uncertainties and variability between the offset well and the salt formation of interest. These uncertainties may exist in the form of differences in salt creep profiles between salts of an offset well and the subterranean salt formation of interest due to differences in moisture content, temperature, stresses, and the like. In such cases, parametric analysis may be performed to understand the effect of changing salt creep profile on cement sheath mechanical integrity of a proposed cement slurry.

Combinations of the various methods of experimentally determining the salt creep profile of the subterranean salt formation at the one or more locations or lengths of the wellbore thereof may also be employed, without departing from the scope of the present disclosure. Such combinations may, in some instances, enhance the accuracy of the salt creep profile by averaging the various data, taking into account certain error factors that may be present in the various methods, if at all, and/or statistically evaluating the various data, and the like.

Regardless of the method of obtaining the salt creep load measurement e.g., the core sample salt creep load measurement, the downhole salt creep load measurement, the offset salt creep load measurement, and the like), the salt creep load measurement may be determined by any validated strain rate-stress relationship that can represent salt behavior in the subterranean salt formation. Salts are ductile and have a tendency to undergo deformation in the presence of non-hydrostatic stress states. When salt creep occurs in the absence of cement and casing, the result is partial or complete closure of a wellbore. However, when a cement sheath is present in an annulus between the wellbore and casing, the cement sheath (and the casing) is subject to salt creep load. That is, in-situ salt formations may be at non-creeping equilibrium state as their stress state is isotropic; however, subterranean formation operations (e.g., drilling, cementing, stimulation, and the like) disturb this equilibrium and salt creep results. Moreover, even if the salt formation was in a creeping state, such subterranean formation operations may influence the creeping behavior.

Salt creep may be divided into three distinct states: primary, secondary, and tertiary. Primary salt creep (also known as transient salt creep) is characterized by high deformation in a short period of time: As a salt is subjected to constant loading, the rate of deformation increases at a decreasing rate until it reaches a steady state of deformation, known as secondary salt creep. Secondary salt creep is the longest stage with respect to time and is where strain rate tends to become constant. Finally, tertiary salt creep is characterized at the point in which the rate of deformation increases exponentially until failure of salt is reached. Accordingly, tertiary salt creep causes a volume increase due to fracturing (e.g., microfracturing) in the formation and leads to material failure.

The salt creep load measurements performed for determining the salt creep profiles of the methods of the present disclosure may take into account only secondary salt creep, which is the most dominant and lengthy stage for preparation of a final cement slurry according to the embodiments herein: In other embodiments, however, tertiary salt creep may also be considered during the salt creep analyses described herein, particularly to evaluate different temperatures and stress loading. In yet other embodiments, primary salt creep may be used in the salt creep analyses; however, primary salt creep tends to be quite short lived and may have very little, if any, effect on the salt creep profile. Accordingly, the salt creep load measurements for determining the salt creep profile may take into account secondary salt creep only, secondary and tertiary salt creep only, or all three stages of salt creep, without departing from the scope of the present disclosure.

As discussed above, the salt creep load measurement for primary, secondary, and tertiary salt creep in forming the salt creep profiles of the present disclosure may be determined by any validated strain rate-stress relationship that can represent salt behavior in a subterranean salt formation. In some embodiments, for example, secondary salt creep can be determined using the following model:

$$\dot{\varepsilon}_2 = A_1 \exp\left(\frac{-Q_1}{RT}\right)\left(\frac{S_2}{S_2^0}\right)^{n_1} + A_2 \exp\left(\frac{-Q_2}{RT}\right)\left(\frac{S_2}{S_2^0}\right)^{n_2} \quad \text{Model 1}$$

where $\dot{\varepsilon}_2$ is the second invariant of deviatoric strain; $S_2$ is the second invariant of deviatoric creep strain; $Q_1$ is the activation energy for the first creep mechanism; $Q_2$ is the activation energy for the second creep mechanism; and $A_1$, $A_2$, $n_1$, $n_2$, and $S_2^0$ are material constants for the particular salt type in the formation. The material constants are determined using uniaxial and triaxial creep tests on extracted wellbore core samples, One of skill in the art will understand the tests to be performed, as no single standard procedure is available. As such, the material constants may be determined by one of skill in the art and the outcome generally depends greatly on the procedure followed during testing. Accordingly, it may be best to report results of uni- and triaxial creep tests along with testing protocol. The stress and strain invariants are mathematically connected to individual stresses and strains, such relationships being available in any standard mechanical engineering textbook and known to those of skill in the art. While Model 1 is one of the salt creep models available, as known to those of skill in the art, for example, there are other models that may be used in the methods of the present disclosure. For example, some salt creep models are based on microscopic deformation mechanisms, while others are purely empirical or combinations thereof. The methods disclosed herein are not limited to use of the salt creep analysis defined by Model 1, but any existing or new models defining creeping phenomenon may be used, as the model itself does not affect the method followed, but merely changes the model equation used.

There is no standard equation(s) for tertiary salt creep because it is a failure phenomenon; however, one of skill in the art will understand how to calculate such tertiary salt creep, if it is desired to be used in the methods described herein, based on such factors as the failing salt type, the amount of failing salt, and the like.

Where intercalated salts are evaluated in a subterranean salt formation according to the methods described herein at one or more lengths, the salt creep profile should take into account the salt creep load for each salt type. Moreover, where geological material is layered between or abutting the salt layers (or a single salt), the wellbore loads of such layers may also be desirably taken into account, depending on the particular analysis being performed, as such layers will have different wellbore load stresses exerted on a cement sheath.

A proposed cement slurry may then be designed based on the experimentally determined salt creep profile. The proposed cement slurry is designed based on the salt creep profile for use in a proposed cementing operation involving forming a wellbore load resistant cement sheath within an annulus between the subterranean formation and casing in the formation. The "wellbore load resistant cement sheath," as used herein refers to a cured cement formulation that is resistant, or capable of withstanding, wellbore loads of the subterranean salt formation at one or more locations or lengths thereof (e.g., at at least the first location for the single salt, or at at least the first length for the intercalated salts). As used herein, the term "wellbore loads" refers to pressure, stress, weight, or any other load exerted on a structure in a wellbore (e.g., a cement sheath, casing, and the like). Such wellbore loads may be exerted from the subterranean formation (e.g., salt creep loads), exerted from a structure in the wellbore itself (e.g., casing), exerted from a subterranean formation operation being performed (e.g., drilling, cementing, production, and the like), and the like.

Examples of wellbore loads may include, but are not limited to, the salt creep load previously discussed, a pressure load, a shut-in load, a production load, an injection load, a casing load, and any combination thereof. As used herein, the term "pressure load" refers to stresses experienced when exerting a surface pressure by hydraulic or mechanical means, either inside the casing or in the annulus. The term "shut-in load," as used herein, refers to stresses experienced when the wellbore is closed at the top (i.e., at the surface). The term "production load," as used herein, refers to stresses experienced when hydrocarbons are being produced in the subterranean formation. As used herein, the term "injection load" refers to stresses experienced when a hot fluid or a cold fluid is being injected into the wellbore through casing or tubing. As used herein, the term "casing load" (also referred to as "liner load") refers to axial stresses exerted by casing or liner weight.

The proposed cement slurry designed based on the salt creep profile exhibits a theological profile based on the rheology of the proposed cement slurry. As used herein, "theology" refers to the flow of matter, particularly in the liquid or semi-liquid state. The rheological profile may be used to manipulate the proposed cement slurry, as discussed below, to establish a final cement slurry that is capable of forming the wellbore load resistant cement sheath described herein. Any rheology parameter may be used to establish the rheological profile of the proposed cement slurry and may depend on a number of factors including, but not limited to, the specific type and composition of the proposed cement slurry, the type and composition of the subterranean salt composition, including single salt and/or intercalated salts, and the like. Examples of rheology parameters that may establish the rheological profile of the proposed cement slurry may include, but are not limited to, plastic viscosity, Bingham model yield point, Herschel-Bulkley model parameters, and any combination thereof.

The proposed cement slurry based on the salt creep profile to form a wellbore load resistant cement sheath resistant to wellbore loads (which include salt creep loads) may comprise a number of different components. Generally, any component suitable for use in forming a cement and capable of use in a subterranean formation, which may form a wellbore load resistant cement sheath according to the embodiments described herein, may be suitable for use in the methods of the present disclosure. Examples of suitable components for use in designing the proposed cement slurry are described in detail below.

After designing a proposed cement slurry, the proposed cement slurry is evaluated to experimentally determine and theoretically determine whether it is capable of forming the wellbore resistant cement sheath at one or more locations or lengths (e.g., at at least the first location for the single salt, or at at least the first length for the intercalated salts). That is, the experimental and theoretical determinations are based on the salt creep profile and wellbore loads for which data has been gathered at the one or more wellbore locations or lengths.

Experimental determination of whether the proposed cement slurry is capable of forming the wellbore resistant cement sheath may be performed by curing the proposed cement slurry and experimentally determining the actual thermal and thermo-mechanical properties thereof. These properties are then used in structural analysis to determine if the cement sheath stresses are lower than the failure properties of the cement sheath. Such structural analysis includes formation of the geometric model described herein, which may be formed using the actual thermal and thereto-mechanical properties or theoretical thermal and thermo-mechanical properties, as described in detail below. Experimental determination of whether the proposed cement slurry is capable of forming the wellbore resistant cement slurry may be performed by first curing the proposed cement slurry and performing one or more tests to determine the actual thermal and thereto-mechanical properties thereof. Such experimental determination may be performed by subjecting the cured proposed cement stuffy to wellbore load conditions expected within the subterranean formation during actual cementing operations. However, in some embodiments, such wellbore load conditions may not be feasibly achievable in a non-subterranean formation setting (e.g., under laboratory conditions), in which the maximum loading feasible may be used instead (termed herein "maximum laboratory load conditions"). Any lessening in the amount of loading compared to the actual wellbore loads may be compensated for using the theoretical determination comprising forming a geometric model, as described in detail below. Moreover, in some instances, loadings greater than the expected wellbore loads may be used during the experimental determination to ensure that unexpected or unknown loadings are also taken into account (termed herein "excess wellbore load conditions"), without departing from the scope of the present disclosure.

In some embodiments, experimental determination may be performed by first curing the proposed cement slurry, followed by performing an ultrasonic cement analyzer test on the cured proposed cement slurry. Ultrasonic cement analyzer testing may utilize a non-destructive method for determining the relative strength development of the cured proposed cement slurry under wellbore load conditions, maximum laboratory load conditions, or excess wellbore load conditions, which may be based, for example, on ultrasonic pulse velocity in the cured proposed cement slurry and its compressive strength. As previously discussed, the cured proposed cement slurry may be subjected to loads greater than the wellbore loads, without departing from the scope of the present disclosure. Such may be desirable in finally establishing the final cement slurry capable of forming the wellbore load resistant cement sheath, as described below, to account for any unknown or unexpected wellbore loads that the wellbore load resistant cement sheath may encounter.

In other embodiments, experimental determination of whether the proposed cement slurry is capable of forming the wellbore resistant cement sheath may be performed by first curing the proposed cement slurry and performing uniaxial and triaxial compression tests on the cured proposed cement slurry under wellbore load conditions, maximum laboratory load conditions, or excess wellbore load conditions. The results from such experimental determination are then used in structural analysis to determine if the cement sheath stresses are lower than the failure properties of the cement sheath. Such uniaxial and triaxial compression tests may be destructive in nature and performed using any known or unknown techniques and methodology, as the methodology itself does not affect the method of the present disclosure followed, but merely changes the testing methodology equation used. The uniaxial and triaxial compression tests test the capacity of the cured proposed cement slurry to withstand wellbore loads that tend to reduce size (e.g., crush or compact, and the like) in one or three directions, respectively. Again, the cured proposed cement may be subjected to loads greater than the wellbore loads, without departing from the scope of the present disclosure.

The actual thermal and thereto-mechanical properties are determined by curing the proposed cement slurry and performing a battery of tests using the methods described above. Such tests may include, but are not limited to, uniaxial experiments, triaxial experiments, tensile strength testing, thermal conductivity and specific heat and thermal expansion testing, and shrinkage testing. Such testing may be performed according to the American Society for Testing and Materials procedures D3148-02, D2664-95a, C307, C470/C470M, C1608, or American Petroleum Institute Recommended Practice 10B-2, or other standard testing methodologies.

Combinations of the various methods of experimentally determining whether the proposed cement slurry is capable of forming a wellbore load resistant cement sheath at the one or more locations or lengths of the wellbore thereof may also be employed, without departing from the scope of the present disclosure. Such combinations may, in some instances, enhance the accuracy of the experimental determination by averaging the various data, into account certain error factors that may be present in the various methods, if at all, and/or statistically evaluating the various data, and the like.

Theoretically determining whether the proposed cement slurry is capable of forming the wellbore load resistant cement sheath at one or more locations or lengths in the wellbore of the subterranean salt formation (e.g., at at least the first location for the single salt, or at at least the first length for the intercalated salts) may be determined by first designing an electronic geometric model of the subterranean salt formation at the one or more locations or lengths. Each operational phase of a wellbore (e.g., drilling, running casing, cementing, wait-on-cement, pressure testing, production, and the like) may result in new temperature and fluid pressures within casing in the wellbore. Numerically, these are represented in the form of temperature and pressure changes inside the casing. Due to the changing values, the casing-cement-formation structural response may be modeled, and quantified as stresses. Of particular importance to the present disclosure are the stresses in the cement sheath (e.g., the cured proposed cement slurry, and the cured final cement slurry, discussed below), which may be dependent upon the operational phase being performed, temperatures, and pressures—equating to the wellbore loads described herein—applied inside the casing or from the subterranean formation. In some embodiments, the structural response of the casing-cement-formation may be quantified numerically using a finite element technique or any other numerical solution technique or analytical/semi-analytical technique capable of solving stress-strain relationships for solid structures.

Where a single salt is located at a first location in a wellbore in a subterranean salt formation, the electronic geometric model may be an electronic, cross-section geometric model representing the subterranean salt formation, the casing, and the proposed cement slurry after curing at the first location. Although described herein as modeling a single location having a single salt, at least a second location in the subterranean salt formation comprising another salt (which may be of the same or different type) may also be analyzed and have an electronic geometric model prepared according to the description herein, without departing from the scope of the present disclosure. The electronic, cross-section geometric model is thus a two-dimensional cross-section of the wellbore in the subterranean salt formation at the first location of interest comprising the single salt. Referring now to FIG. 1, illustrated is a representation of an electronic, cross-section geometric model at a location comprising a single salt. As depicted, three concentric circular structures are shown, depicting from the inner most concentric structure to the outermost: the casing, cement, and subterranean formation. FIG. 1 is an illustrative example, and the size and shape of the casing, cement, and formation will not be representative of all wellbores. FIG. 1 is for illustrative purposes only and in no way is meant to limit the present disclosure.

The first location comprising the single salt in the subterranean formation may be representative of the area in which the single salt exhibits the greatest salt creep load, so as to take into account the most severe loading in establishing a final cement slurry capable of forming the wellbore load resistant cement sheath, as described below. Such salt creep loads, along with the remaining wellbore loads of interest, are tested using the electronic, cross-section geometric model by simulating a plane-strain condition of such wellbore loads on the cured proposed cement slurry at the first location (or additional locations). As used herein, the term "plane-strain" refers to the deformation of a structure (e.g., the cured proposed cement slurry, the casing, and the like) in which the deformation is parallel to a given plane. For the wellbore load exertion on the subterranean salt formation at a location comprising a single salt, where such exertion is theoretically determined using an electronic, cross-section geometric model, the wellbore loads are radially compressive in nature and, accordingly, compression may be the only failure mechanism resulting from the wellbore loads.

The plane-strain condition of the wellbore loads simulated using the electronic, cross-section geometric model of the present disclosure at the first location (or any other locations) for a single salt may he simulated based on the wellbore loads and one or both of: (1) the theoretical thermal and thereto-mechanical properties of the cured proposed cement slurry, or (2) the actual thermal and thermo-mechanical properties of the cured proposed cement slurry established during the experimental determination of whether the proposed cement slurry is capable of forming the wellbore load resistant cement slurry described herein. For example, the experimental determination of whether the proposed cement slurry is capable of forming the wellbore load resistant cement slurry may be first performed to acquire the actual thermal and thermo-mechanical properties before simulating the plane-strain condition (or axisymmetric condition, or three-dimensional condition, as discussed below) of the wellbore loads. In other embodiments, the theoretical determination may be first performed by simulating the plane-strain condition (or axisymmetric condition, or three-dimensional condition, as discussed below) the theoretical thermal and thermo-mechanical properties, followed by the experimental determination. In yet other embodiments, either or both of the experimental determination and theoretical determination may be performed in any order and repeated several times. For example, the theoretical determination may be first performed, followed by the experimental determination, followed again by the theoretical determination using the actual thermal and thermo-mechanical properties, without departing from the scope of the present disclosure. In some embodiments, the plane-strain condition of the wellbore loads simulated using the electronic, cross-section geometric model may also take into account the elastic and failure properties of the casing and the subterranean salt formation, which may be obtained based on known types of casing and subterranean salt formations to one of skill in the art.

The thermal and thermo-mechanical properties of the cured proposed cement slurry used to theoretically determine whether the cured proposed cement slurry is capable of forming the wellbore load resistant cement sheath based may be calculated based on one or more of thermal conductivity, thermal diffusivity, tensile strength, compressive strength, hydration volume change, Young's modulus, and Poisson's ratio.

The theoretical thermal and thereto-mechanical properties of the cured proposed cement slurry may be based on scientifically available historical data related to such properties of similar cement slurries that have been used in the past and tested, including those used in similar subterranean salt formations (e.g., offset wells). The theoretical thermal and thermo-mechanical properties based on historical data are compared against the wellbore loads that are expected to be exerted on the cured proposed cement slurry.

The actual thermal and thermo-mechanical properties are determined by curing the proposed cement slurry and performing a battery of tests as described above with reference to the experimental determination of whether the proposed cement slurry is capable of forming the wellbore load resistant cement sheath of the present disclosure.

Figure 2:
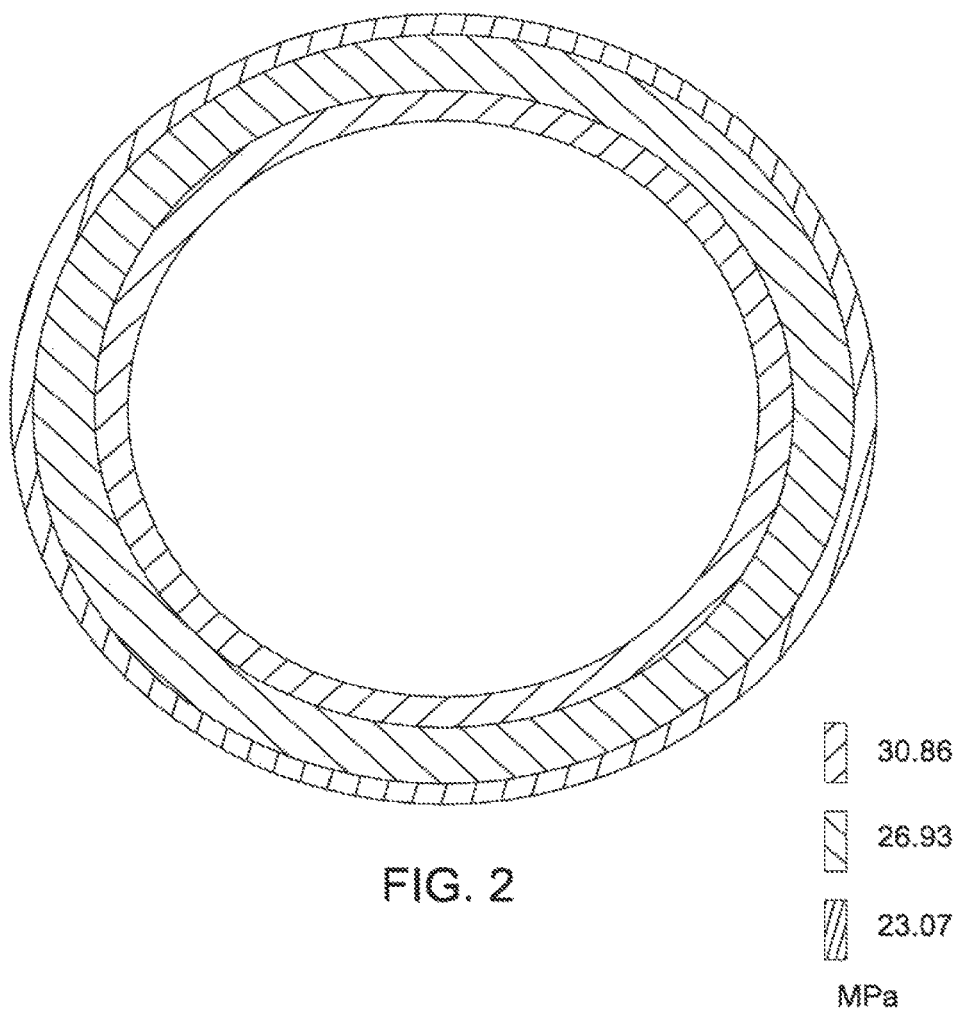
FIG. 2 illustrates a representation of an electronic, cross-section geometric model simulating the plane-strain condition of a single salt at a location in a wellbore in a subterranean salt formation, according to one or more embodiments of the present disclosure.

Referring now to FIG. 2, illustrated is an electronic, cross-section geometric model simulating the plane-strain condition of a single salt at a first location in a wellbore in a subterranean salt formation. Shown is a representative cured proposed cement slurry forming a cement sheath accounting for wellbore loads exerted thereupon, and taking into account the thermal and thermo-mechanical properties of the cured proposed cement slurry (i.e., actual and/or theoretical). As shown, the radial stresses exerted on the external, outermost portion of the cured proposed cement slurry (i.e., the portion in contact with the subterranean salt formation (not shown)) exhibit stresses of about 23.07 megapascals (MPa), and up to the next range of radial stress of about 26.93 MPa. Moving toward the casing (not shown), these radial stresses increase as increased pressure is placed on the cured proposed cement sheath, up to as high as about 30.86 MPa for the innermost portion of the cured proposed cement slurry, for the representative cured proposed cement slurry shown. If the radial stresses shown in the plane-strain simulation of the electronic, cross-section geometric model exceed the ability of the cured proposed cement slurry to resist such wellbore loads, the cured proposed cement slurry will fail by compression. Moreover, by representing the radial stresses shown in in FIG. 2, for example, as a fraction of the compressive strength of the proposed cement slurry, the proximity of the proposed cement slurry to failure may also be defined. The "proximity" is a stress-state factor, where a stress-state factor close to failure has a high risk of failure and vice-versa. FIG. 2 is an illustrative example and the radial stresses exhibited will not be representative of all cured cement slurries and may vary in any numerical direction depending at least upon the wellbore stresses encountered. FIG. 2 is for illustrative purposes only and in no way is meant to limit the present disclosure.

Referring now to the methods described herein related to intercalated salts, where intercalated salts are located at a first length in a wellbore in a subterranean salt formation for use in the embodiments described herein, the electronic geometric model may be an electronic, longitudinal geometric model representing the subterranean salt formation, the casing, and the proposed cement slurry after curing along the first length. The electronic, longitudinal geometric model may be two-dimensional, three-dimensional, or may possess characteristics of both two-dimensions and three-dimensions, without departing from the scope of the present disclosure. Although described herein as modeling a single length having intercalated salts (e.g., at least two salt layers abutting one another or between or adjacent to geological material), at least a second length (e.g., one or more additional lengths, or the entire length) in the subterranean salt formation comprising other intercalated salts (which may be of the same or different type) may also be analyzed and have an electronic geometric model prepared according to the description here, without departing from the scope of the present disclosure. The electronic, longitudinal geometric model is thus a length-wise model of the wellbore in the subterranean salt formation at the first length of interest comprising the intercalated salts, and may represent the subterranean salt formation, the casing, and the proposed cement slurry after curing.

Figure 3:
FIG. 3 illustrates a representation of an electronic, longitudinal geometric model at a length comprising intercalated salts, according to one or more embodiments of the present disclosure.

Referring now to FIG. 3, illustrated is a representative electronic, longitudinal geometric model that may be designed in accordance with the methods of the present disclosure having represented thereon intercalated salts. As depicted, the electronic, longitudinal geometric model depicts a length-wise representation of a subterranean salt formation comprising two different salts and an area of overburden and sub-salt. The overburden and sub-salt areas are located at the top-most and bottom-most length, respectively, of the electronic, longitudinal geometric model of the wellbore, each having matching visual texture representations (diagonal parallel lines at about 45° from an upper right to a lower left). The overburden and sub-salt areas represent non-creeping portions of the wellbore and may, in some instances, represent non-creeping salt material or other geological material, as described above. Such overburden and sub-salt areas may be taken into account in analyzing wellbore loads and establishing a final cement slurry capable of forming a wellbore load resistant cement slurry. The two textures between the overburden and sub-salt areas represent the intercalated layering of two salts, halite and tachyhydrite, the first texture beneath the overburden (diagonal parallel lines from an upper right to a lower left) being halite and the second texture beneath the overburden (diagonal parallel lines from an upper left to a lower right) being tachyhydrite. FIG. 3 is an illustrative example and types, amounts, and positions of the intercalated salts exhibited will not be representative of all subterranean salt formations or portions thereof. FIG. 3 is for illustrative purposes only and in no way is meant to limit the present disclosure. Moreover, although FIG. 3 represents a vertical wellbore, deviated and horizontal wellbores may also be represented using the methods described herein, without departing from the scope of the present disclosure.

Typically, each of the various intercalated salts will have different salt creep load rates (e.g., some slower than others, some faster than others, and the like); additionally, and any geological material will likely also exhibit different loading rates. Such salt creep loads, along with the remaining wellbore loads of interest, are tested using the electronic, longitudinal geometric model by simulating an axisymmetric condition or three-dimensional condition of such wellbore loads on the cured proposed cement slurry at the first length (or additional lengths). As used herein, the term "axisymmetric condition" refers to the deformation of a structure (e.g., the cured proposed cement slurry, the casing, and the like) about a symmetrical axis, including in two- and three-dimensions. As used herein, the term "three-dimensional condition" refers to the deformation of a structure (e.g., the cured proposed cement slurry, the casing, and the like) irrespective of an axis relationship (e.g., in lengths of a subterranean formation that are not axisymmetric). For the wellbore load exertion on the subterranean salt formation at a length comprising intercalated salts, where such exertion is theoretically determined using an electronic, longitudinal geometric model, the wellbore loads are thus radially compressive and tensile in nature and vary at different locations along the length of the wellbore.

The axisymmetric condition or three-dimensional condition of the wellbore loads simulated using the electronic, longitudinal geometric model of the present disclosure at the first length (or any other lengths) for intercalated salts may be simulated based on the wellbore loads and one or both of: (1) the theoretical thermal and thermo-mechanical properties of the cured proposed cement slurry, or (2) the actual thermal and thermo-mechanical properties of the cured proposed cement slurry established during the experimental determination of whether the proposed cement slurry is capable of forming the wellbore load resistant cement slurry described herein. The theoretical and actual thermal and thermo-mechanical properties may be obtained as described previously with reference to the plane-strain condition of the electronic, cross-section geometric model for single salts in a subterranean salt formation and the experimental determination of whether the proposed cement slurry is capable of forming the wellbore load resistant cement slurry described herein. In some embodiments, the axisymmetric condition or three-dimensional condition of the wellbore loads simulated using the electronic, longitudinal geometric model may also take into account the elastic and failure properties of the casing and the subterranean salt formation, which may be obtained based on known types of casing and subterranean salt formations to one of skill in the art.

Figure 4:
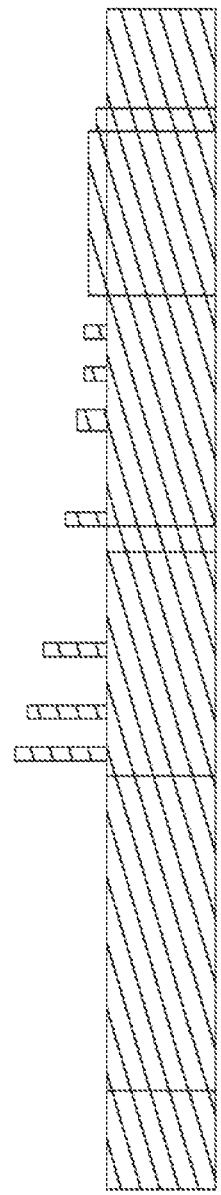
FIG. 4 illustrates a representation of an electronic, longitudinal geometric model simulating the axisymmetric condition of intercalated salts at a first length in a wellbore in a subterranean salt formation, according to one or more embodiments of the present disclosure.

Referring now to FIG. 4, illustrated is an electronic, longitudinal geometric model simulating the axisymmetric condition of intercalated salts at a first length in a wellbore in a subterranean salt formation. As shown, the length of the wellbore has exerted thereupon differing wellbore loads at different locations along the length of the wellbore. Specifically, the wellbore is shown as exhibiting varying salt creep loads that impinge into the wellbore causing wellbore closure in the absence of casing and cement, but rather in the presence of only a treatment fluid (e.g., drilling mud). As shown, the wellbore is closing at different rates and amounts due to different salt creep rates of the various intercalated salts, depicted as protrusions to the left of the wellbore. The longer the protrusion, the greater the salt creep rate. If the cured proposed cement slurry were positioned adjacent to the wellbore represented in FIG. 4, certain portions of the cured proposed cement slurry would be more compressed relative to other portions along the length represented. Further, at junctions between slow and fast creeping salts, the cured proposed cement slurry would be pushed radially inward on the fast creeping salt side and pushed radially outward on the slow creeping salt side, resulting in a tensile load on the proposed cured cement. Accordingly, for the cured proposed cement slurry to fail as a cement sheath, either the tensile stresses exceed the cement tensile strength, or the compressive stresses exceed the cement compressive strength. Often, the tensile strength of the cement is much reduced compared to the compressive strength and, thus, may be critical in manipulating the proposed cement slurry to establish a final cement slurry capable of forming a wellbore load resistant cement sheath. FIG. 4 is an illustrative example and the salt creep loads and rates will vary among differing subterranean salt formations. FIG. 4 is for illustrative purposes only and in no way is meant to limit the present disclosure.

As previously mentioned, the sequence of experimental determination and theoretical determination of whether the proposed cement slurry is capable of forming the wellbore resistant cement slurry is not limiting and they may be performed in any order, without departing from the scope of the present disclosure. Determining experimentally whether the proposed cement slurry, once cured into a cement sheath, can actually withstand the wellbore loads and form a wellbore load resistant cement sheath may be particularly laborious and may thus be preferably performed only after theoretically determining that the proposed cement slurry is likely to withstand such loads, thereby reducing the likelihood of having to repeat the step, although repeating the step does not depart from the scope of the present disclosure. For example, one or more experimental determinations may be performed before one or more theoretical determinations, and in some instances the actual thermal and theretomechanical properties may then be used in performing the theoretical determination by simulating the wellbore load conditions using the geometric model. In other embodiments, one or more theoretical determinations may be performed before one or more experimental determinations.

If at any point during the experimental determination or the theoretical determination of whether the proposed cement slurry is capable of forming the wellbore resistant cement sheath for a particular subterranean salt formation (e.g., comprising a single salt or intercalated salts, as well as other geological material), the composition of the proposed cement slurry may be manipulated and new proposed cement slurry may be evaluated using the experimental and/or theoretical determination of whether the newly formed proposed cement slurry is capable of forming the wellbore resistant cement slurry. Upon optimizing the proposed (one or more iterations) cement slurry based on the methods of the present disclosure such that it is capable of forming the wellbore resistant cement slurry, it may be termed a "final cement slurry", which may be used during an actual cementing operation in the particular subterranean salt formation of interest.

Manipulation of the proposed cement slurry, for example, may be performed after performing the one or more experimental determinations of whether the proposed cement slurry is capable of forming the wellbore load resistant cement sheath, but before performing the one or more theoretical determinations of whether the proposed cement slurry is capable of forming the wellbore load resistant cement sheath, followed by repeating one, or both, of the one or more experimental determinations and the one or more theoretical determinations in any order until a final cement slurry is established that is capable of forming the wellbore load resistant cement sheath and performing a final cementing operation with the final cement slurry. In other embodiments, manipulation of the proposed cement slurry, for example, may be performed after performing the one or more theoretical determinations of whether the proposed cement slurry is capable of forming the wellbore load resistant cement sheath, but before performing the one or more experimental determinations of whether the proposed cement slurry is capable of forming the wellbore load resistant cement sheath, followed by repeating one, or both, of the one or more theoretical determinations and the one or more experimental determinations in any order until a final cement slurry is established that is capable of forming the wellbore load resistant cement sheath and performing a final cementing operation with the final cement slurry.

In yet other embodiments, manipulation of the proposed cement slurry, for example, may be performed after performing both of the one or more experimental determinations and the one or more theoretical determinations of whether the proposed cement slurry is capable of forming the wellbore load resistant cement sheath, followed by repeating one, or both, of the one or more experimental determinations and the one or more theoretical determinations in any order until a final cement slurry is established that is capable of forming the wellbore load resistant cement sheath and performing a final cementing operation with the final cement slurry.

In some embodiments, the proposed cement slurry, alone or after manipulation, may meet the requirements of a final cement slurry capable of forming the wellbore load resistant cement sheath for a particular subterranean salt formation and for particular subterranean operations being performed therein. However, an operator may further choose to manipulate the proposed cement slurry to account for potential stresses that may be further imposed on the cured proposed cement slurry forming a cement sheath. That is, if for the selected operational phase the proposed cement slurry is capable of forming a wellbore load resistant cement sheath, it qualifies as a final cement slurry. However, the proposed cement slurry may be even further manipulated to form an optimized final cement slurry that takes into account remaining capacity. As used herein, the term "remaining capacity" is a scaled value, representing the maximum acceptable value of compressive and/or tensile wellbore loads (stresses) scaled to the ultimate compressive or tensile strength of the proposed cement slurry. If the resultant remaining capacity is below an operator defined recommended value, which may account for potential unknown or unexpected wellbore loads, the proposed cement slurry may be further manipulated in accordance with any of the methods described above (e.g., before or after one or both of the experimental and/or theoretical determination of whether the proposed cement slurry is capable of forming the wellbore load resistant cement sheath) by further accounting for the remaining capacity in addition to the wellbore loads.

Figure 5:
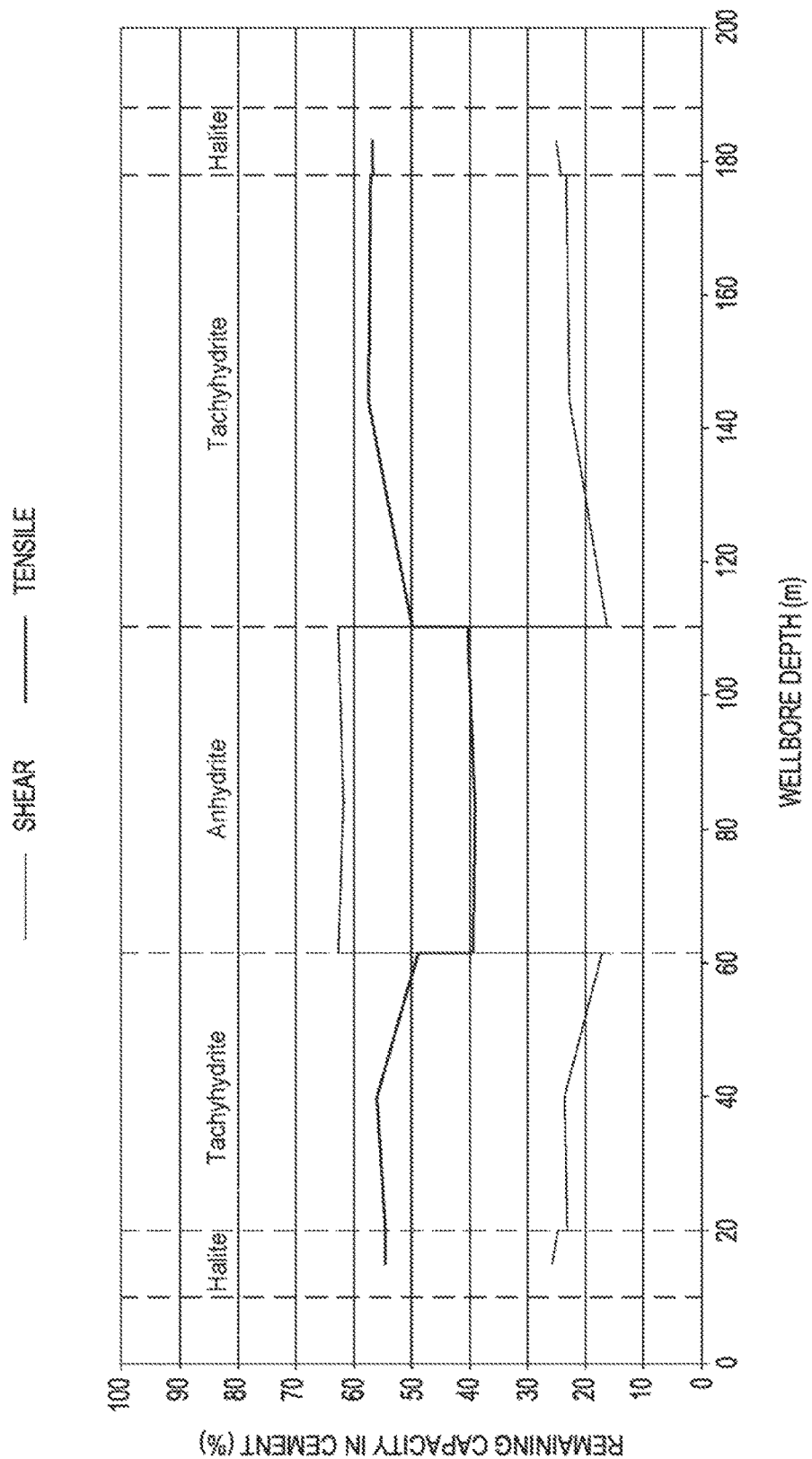
FIG. 5 illustrates a graph depicting the remaining capacity for a representative proposed cured cement slurry subjected to wellbore loads in the presence of a formation and casing, according to one or more embodiments of the present disclosure.

Referring now to FIG. 5, illustrated is a graph depicting the remaining capacity for a representative proposed cured cement slurry subjected to wellbore loads in the presence of a formation and casing. The remaining capacities depicted in FIG. 5 are in compressive (also referred to as shear) and tensile mode for a representative electronic, longitudinal geometric model (not shown) of a length in a wellbore in a subterranean salt formation comprising intercalated salts. As shown, the remaining capacity of each of the various intercalated salt types is an indication of the remaining capacity (i.e., the residual elastic capacity) in the cured proposed cement slurry before failure. A 100% remaining capacity indicates that the cured proposed cement slurry subjected to wellbore loads is completely intact, while a 0% remaining capacity indicates that failure of the cured proposed cement slurry.

In some embodiments, the designed proposed cement slurry and established final cement slurry (collectively referred to below as "cement slurry" unless specifically stated otherwise) may comprise an aqueous base fluid and a cementitious material. Any aqueous base fluid suitable for use in forming a curable cement slurry capable of use in a subterranean salt formation may be suitable for use in the embodiments described herein. In particular, the suitable aqueous base fluids for use in the proposed and final cement slurries discussed herein may be any aqueous base fluid suitable for use in the subterranean formation, as previously discussed, including, but not limited to, freshwater, saltwater, brine, seawater, and any combination thereof. Generally, the aqueous base fluid may be from any source provided, for example, that it does not contain an excess of compounds that may undesirably affect the performance of the proposed or final cement slurry or the pumpability thereof. For example, the aqueous base fluid may be recovered from a subterranean formation, recycled from a treatment fluid previously used, treated wastewater, and the like, without departing from the scope of the present disclosure.

The cementitious material of the embodiments herein may be any cementitious material suitable for use in forming a curable cement slurry. In preferred embodiments, the cementitious material may be a hydraulic cement. Hydraulic cements harden by the process of hydration due to chemical reactions to produce insoluble hydrates (e.g., calcium hydroxide) that occur independent of the cement's water content (e.g., hydraulic cements can harden even under constantly damp conditions). Thus, hydraulic cements are preferred because they are capable of hardening regardless of the water content of a particular subterranean formation. Suitable hydraulic cements may include, but are not limited to Portland cement, Portland cement blends (e.g., Portland blast-furnace slag cement and/or expansive cement), non-Portland hydraulic cement (e.g., super-sulfated cement, calcium aluminate cement, and/or high magnesium-content cement), and any combination thereof. Generally, the cementitious material may be present in the cement slurries described herein to achieve a cement slurry density in the range of from a lower limit of about 9.0 pounds per gallon ("ppg"), 10 ppg, 11 ppg, 12 ppg, 13 ppg, 14 ppg, 15 ppg, 16 ppg, and 17 ppg to an upper limit of about 25 ppg, 24 ppg, 23 ppg, 22 ppg, 21 ppg, 20 ppg, 19 ppg, 18 ppg, and 17 ppg, encompassing any value and subset therebetween.

In some embodiments, the cement slurry may additionally comprise a pozzolanic material. Pozzolanic materials may aid in increasing the density and strength of the cementitious material. As used herein, the term "pozzolanic material" refers to a siliceous material that, while not being cementitious, is capable of reacting with calcium hydroxide (which may be produced during hydration of the cementitious material). Because calcium hydroxide accounts for a sizable portion of most hydrated hydraulic cements and because calcium hydroxide does not contribute to the cement's properties, the combination of cementitious and pozzolanic materials may synergistically enhance the strength and quality of the cement. Any pozzolanic material that is reactive with the cementitious material may be used in the embodiments herein. Suitable pozzolanic materials may include, but are not limited to silica fume, metakaolin, fly ash, diatomaceous earth, calcined or uncalcined diatomite, calcined fullers earth, pozzolanic clays, calcined or uncalcined volcanic ash, bagasse ash, pumice, pumicite, rice hull ash, natural and synthetic zeolites, slag, vitreous calcium aluminosilicate, and any combinations thereof. In some embodiments, the pozzolanic material may be present in an amount in the range of a lower limit of about 5%, 7.5%, 10%, 12.5%, 15%, 17.5%, 20%, 22.5%, 25%, 77.5%, 30%, and 32.5% to an upper limit of about 60%, 57.5%, 55%, 52.5%, 50%, 47.5%, 45%, 42.5%, 40%, 37.5%, 35%, and 32.5% by weight of the dry cementitious material, encompassing any value and subset therebetween.

In some embodiments, the cement slurry may further comprise any cement additive for use in forming a curable cement slurry. Cement additives may be added in order to modify the characteristics of the cement slurry, for example. Such cement additives include, but are not limited to, a defoamer, a cement accelerator, a cement retarder, a fluid-loss additive, a cement dispersant, a cement extender, a weighting agent, a lost circulation additive, and any combination thereof. The cement additives of the embodiments herein may be in any form, including dry form or liquid form.

Manipulation of the proposed cement slurry in accordance with the methods of the present disclosure as provided above, therefore, may involve altering one or more of the amount, type, presence, or absence of one or more components of the slurry (e.g., the aqueous base fluid, the cementitious material, the pozzolanic material, the cement additive, and any combination thereof). That is, in some embodiments, the type of base fluid may be changed or adjusted (e.g., adding fresh water to seawater). In other embodiments, a pozzolanic material may be added when it was not present before, the type of cementitious material may be completely changed or a new blend proposed, a cement additive may be removed or added from the proposed cement slurry, and the like. The combinations of changes are not limited and one of skill in the art, with the benefit of this disclosure, will understand how those changes will affect the proposed cement slurry, with an eye toward manipulating the proposed cement slurry such that it is capable of forming the wellbore load resistant cement sheath described herein.

In various embodiments, systems configured for preparing, transporting, and delivering the final cement slurries described herein to a downhole location are described. In various embodiments, the systems can comprise a pump fluidly coupled to a tubular (e.g., a casing, drill pipe, production tubing, coiled tubing, etc.) extending into a wellbore penetrating a subterranean formation, the tubular may be configured to circulate or otherwise convey a final cement slurry prepared as described herein. The pump may be, for example, a high pressure pump or a low pressure pump, which may depend on, inter cilia, the viscosity and density of the final cement slurry, the type of the cementing operation, and the like.

In some embodiments, the systems described herein may further comprise a mixing tank arranged upstream of the pump and in which the final cement slurry is formulated. In various embodiments, the pump (e.g., a low pressure pump, a high pressure pump, or a combination thereof) may convey the final cement slurry from the mixing tank or other source of the final cement slurry to the tubular. In other embodiments, however, the final cement slurry can be formulated offsite and transported to a worksite, in which case the final cement slurry may be introduced to the tubular via the pump directly from a transport vehicle or a shipping container (e.g., a truck, a railcar, a barge, or the like) or from a transport pipeline. In yet other embodiments, the final cement slurry may be formulated on the fly at the well site where components of the final cement slurry are pumped from a transport (e.g., a vehicle or pipeline) and mixed during introduction into the tubular. In any case, the final cement slurry may be drawn into the pump, elevated to an appropriate pressure, and then introduced into the tubular for delivery downhole.

Figure 6:
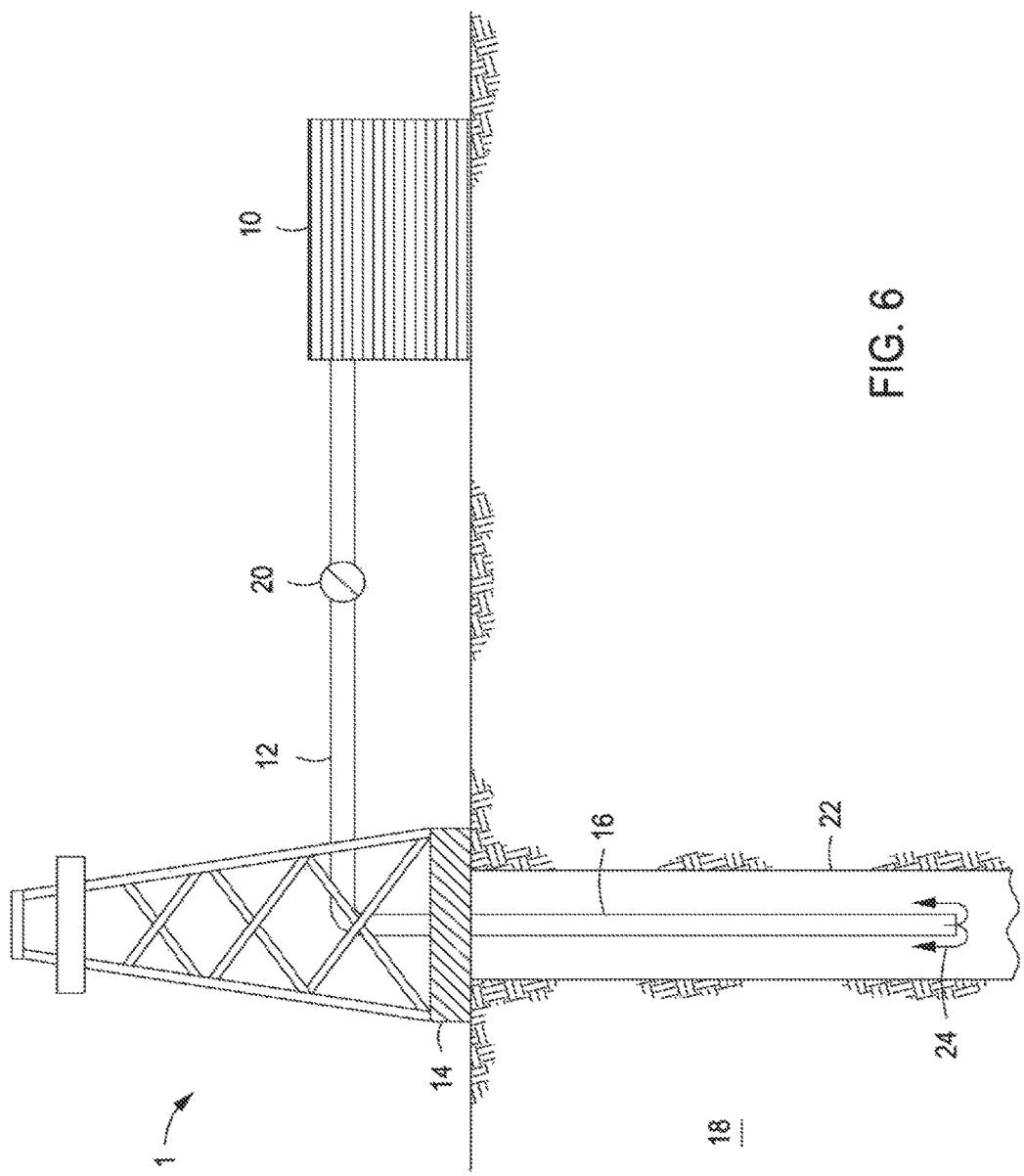
FIG. 6 illustrates an embodiment of a system configured for delivering the final cement slurries described herein to a downhole location, according to one or more embodiments of the present disclosure.

FIG. 6 shows an illustrative schematic of a system that can deliver final cement slurry of the present disclosure to a downhole location, according to one or more embodiments. It should be noted that while FIG. 6 generally depicts a land-based system, it is to be recognized that like systems may be operated in subsea locations as well. As depicted in FIG. 6, system 1 may include mixing tank 10, in which a final cement slurry of the present disclosure may be formulated. Again, in some embodiments, the mixing tank 10 may represent or otherwise be replaced with a transport vehicle or shipping container configured to deliver or otherwise convey the final cement slurry to the well site. The final cement slurry may be conveyed via line 12 to wellhead 14, where the final cement slurry enters tubular 16 (e.g., a casing, drill pipe. production tubing, coiled tubing, etc.), tubular 16 extending from wellhead 14 into wellbore 22 penetrating subterranean formation 18. Upon being ejected from tubular 16, the final cement slurry may subsequently return up the wellbore in the annulus between the tubular 16 and the wellbore 22 as indicated by flow lines 24. In other embodiments, the final cement slurry may be reverse pumped down through the annulus and up tubular 16 back to the surface, without departing from the scope of the disclosure. Pump 20 may be configured to raise the pressure of the final cement slurry to a desired degree before its introduction into tubular 16 (or annulus). It is to be recognized that system 1 is merely exemplary in nature and various additional components may be present that have not necessarily been depicted in FIG. 6 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like. Moreover, reverse cementing, where the final cement slurry is directly placed in the annulus between the tubular 16 and the wellbore 22 may also be performed in accordance with the embodiments described herein, without departing from the present disclosure.

One skilled in the art, with the benefit of this disclosure, should recognize the changes to the system described in FIG. 6 to provide for other cementing operations squeeze operations, reverse cementing (where the cement is introduced into an annulus between a tubular and the wellbore and returns to the wellhead through the tubular), and the like).

It is also to be recognized that the disclosed final cement slurries may also directly or indirectly affect the various downhole equipment and tools that may come into contact with the final cement slurry during operation. Such equipment and tools may include, but are not limited. to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), wellbore projectiles (e.g., wipers, plugs, darts, balls, etc.), logging tools and related telemetry equipment, actuators (e.g., electromechanical devices, hydromechanical devices, etc.), sliding sleeves, production sleeves, plugs, screens, filters, flow control devices inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 6.

Embodiments disclosed herein include Embodiment A and Embodiment B.

Embodiment A: A method comprising: (a) providing a wellbore in a subterranean salt formation, wherein the subterranean salt formation comprises a single salt at a first location; (b) experimentally determining a salt creep profile for the single salt at the first location in the wellbore in the subterranean formation; (c) designing a proposed cement slurry based on the salt creep profile, the proposed cement slurry having a rheology profile, wherein the proposed cement slurry is designed for use in a proposed cementing operation involving forming a wellbore load resistant cement sheath within an annulus between the subterranean salt formation and casing, and wherein the wellbore load resistant cement sheath is resistant to wellbore loads; (d) experimentally determining whether the proposed cement slurry is capable of forming the wellbore load resistant cement sheath at the first location based on actual thermal and thermo-mechanical properties of the proposed cement slurry; (e) theoretically determining whether the proposed cement slurry is capable of forming the wellbore load resistant cement sheath at the first location, the theoretical determination comprising: (e)(1) designing an electronic, cross-section geometric model of the subterranean salt formation at the first location, wherein the geometric model represents the subterranean salt formation, the casing, and the proposed cement slurry after curing, and (e)(2) simulating a plane-strain condition of the wellbore loads on the cured proposed cement slurry at the first location in the subterranean formation using the geometric model, (f) establishing a final cement slurry capable of forming the wellbore load resistant cement sheath; and (g) performing a final cementing operation with the final cement slurry in the subterranean salt formation.

Embodiment A may have one or more of the following additional elements in any combination:

Element A1: Wherein the salt creep profile in step (b) is experimentally determined by a method selected from the group consisting of: (b1) obtaining at least one wellbore core sample of the wellbore in the subterranean formation at the first location, and performing a core sample salt creep load measurement using the wellbore core sample, (b2) performing a downhole salt creep load measurement at the first location in the wellbore in the subterranean formation; (b3) obtaining an offset well salt creep load measurement and performing a parametric analysis thereon, wherein the offset well and the wellbore in the subterranean salt formation are located in a same oil field, and any combination thereof.

Element A2: Wherein the wellbore loads are selected from the group consisting of a salt creep load, a pressure load, a shut-in load, a production load, an injection load, and any combination thereof.

Element A3: Wherein whether the proposed cement slurry is capable of forming the wellbore load resistant cement sheath in step (d) is experimentally determined by a method selected from the group consisting of: (d1) curing the proposed cement slurry, and performing an ultrasonic cement analyzer test on the cured proposed cement slurry, (d2) curing the proposed cement slurry, and performing uniaxial and triaxial compression tests on the cured proposed cement slurry, and any combination thereof.

Element A4: Wherein the plane-strain condition of the wellbore loads on the cured proposed cement slurry at the first location in the subterranean formation using the geometric model in step (e)(2) is simulated based the wellbore loads and one or both of: theoretical thermal and thereto-mechanical properties of the cured proposed cement slurry, or the actual thermal and thermo-mechanical properties of the cured proposed cement slurry in step (d).

Element A5: Wherein the plane-strain condition of the wellbore loads on the cured proposed cement slurry at the first location in the subterranean formation using the geometric model in step (e)(2) is simulated based the wellbore loads and one or both of: theoretical thermal and thermo-mechanical properties of the cured proposed cement slurry, or the actual thermal and thereto-mechanical properties of the cured proposed cement slurry in step (d); and wherein step (e) is performed before step (d), wherein step (e)(2) is simulated based on the theoretical thermal and thermo-mechanical properties, and further comprising repeating a second step (e) after step (d) wherein the second step (e) comprises step (e)(2) of simulation based on the actual theoretical thermal and thermo-mechanical properties in step (d).

Element A6: Further comprising either performing step (d) before step (e), or performing step (e) before step (d).

Element A7: Further comprising manipulating the proposed cement slurry after step (d), and repeating steps (d) through (e) until the proposed cement slurry is capable of forming the wellbore load resistant cement sheath.

Element A8: Further comprising manipulating the proposed cement slurry after step (e), and repeating steps (d) through (e) until the proposed cement slurry is capable of forming the wellbore load resistant cement sheath.

Element A9: Wherein the salt creep profile is based on secondary salt creep; a combination of secondary salt creep and tertiary salt creep; or a combination of primary salt creep, secondary salt creep, and tertiary salt creep.

Element A10: Further comprising a tubular extending into the wellbore in the subterranean salt formation, and a pump fluidly coupled to the tubular; and wherein step (g) is performed by introducing the final cement slurry into the wellbore through the tubular.

By way of non-limiting example, exemplary combinations applicable to Embodiment A include: A with A1 and A4; A with A2, A6, and A10; A with A2, A3, A5, and A9; A with A7 and A8; A with A1, A2, A3, A4, A5, A6, A7, A8, A9, and A10; A with A4, A7, A8, and A10; and the like.

Embodiment B: A method comprising: (a) providing a wellbore in a subterranean salt formation, wherein the subterranean salt formation comprises intercalated salts along a first length of the wellbore; (b) experimentally determining a salt creep profile for the intercalated salts at the first length of the wellbore in the subterranean formation; (c) designing a proposed cement slurry based on the salt creep profile, the proposed cement slurry having a rheology profile, wherein the proposed cement slurry is designed for use in a proposed cementing operation involving forming a wellbore load resistant cement sheath within an annulus between the subterranean salt formation and casing, and wherein the wellbore load resistant cement sheath is resistant to wellbore loads; (d) experimentally determining whether the proposed cement slurry is capable of forming the wellbore load resistant cement sheath at the first length based on actual thermal and thermo-mechanical properties of the proposed cement slurry; (e) theoretically determining whether the proposed cement slurry is capable of forming the wellbore load resistant cement sheath at the first length, the theoretical determination comprising: (e)(1) designing an electronic, longitudinal geometric model of the subterranean salt formation at the first length, wherein the geometric model represents the subterranean salt formation, the casing, and the proposed cement slurry after curing, and (e)(2) simulating an axisymmetric condition or a three-dimensional condition of the wellbore loads on the cured proposed cement slurry at the first location in the subterranean formation using the geometric model, (f) establishing a final cement slurry capable of forming the wellbore load resistant cement sheath; and (g) performing a final cementing operation with the final cement slurry in the subterranean salt formation.

Embodiment B may have one or more of the following additional elements in any combination:

Element B1: Wherein whether the proposed cement slurry is capable of forming the wellbore load resistant cement sheath in step (d) is experimentally determined by a method selected from the group consisting of: (d1) curing the proposed cement slurry, and performing an ultrasonic cement analyzer test on the cured proposed cement slurry, (d2) curing the proposed cement slurry, and performing uniaxial and triaxial compression tests on the cured proposed cement slurry, and any combination thereof.

Element B2: Wherein the wellbore loads are selected from the group consisting of a salt creep load, a pressure load, a shut-in load, a production load, an injection load, and any combination thereof.

Element B3: Wherein the axisymmetric condition or the three-dimensional condition of the wellbore loads on the cured proposed cement slurry at the first length in the subterranean formation using the geometric model in step (e)(2) is simulated based the wellbore loads and one or both of: theoretical thermal and thermo-mechanical properties of the cured proposed cement slurry, or the actual thermal and thermo-mechanical properties of the cured proposed cement slurry in step (d).

Element B4: Wherein the axisymmetric condition or the three-dimensional condition of the wellbore loads on the cured proposed cement slurry at the first length in the subterranean formation using the geometric model in step (e)(2) is simulated based the wellbore loads and one or both of: theoretical thermal and thereto-mechanical properties of the cured proposed cement slurry, or the actual thermal and thermo-mechanical properties of the cured proposed cement slurry in step (d); and wherein step (e) is performed before step (d), wherein step (e)(2) is simulated based on the theoretical thermal and thereto-mechanical properties, and further comprising repeating a second step (e) after step (d) wherein the second step (e) comprises step (e)(2) of simulation based on the actual theoretical thermal and thermo-mechanical properties in step (d).

Element B5: Wherein the electronic, longitudinal geometric model is a three-dimensional model.

Element B6: Further comprising either performing step (d) before step (e), or performing step (e) before step (d).

Element B7: Further comprising manipulating the proposed cement slurry after step (d), and repeating steps (d) through (e) until the proposed cement slurry is capable of forming the wellbore load resistant cement sheath.

Element B8: Further comprising manipulating the proposed cement slurry after step (e), and repeating steps (d) through (e) until the proposed cement slurry is capable of forming the wellbore load resistant cement sheath.

Element B9: Further comprising repeating steps (b) through (e) at at least a second length of the wellbore in subterranean salt formation, wherein the electronic, longitudinal geometric model designed in step (e)(1) represents the first length and at least the second length.

Element B10: Wherein the salt creep profile is based on secondary salt creep; a combination of secondary salt creep and tertiary salt creep; or a combination of primary salt creep, secondary salt creep, and tertiary salt creep.

Element B11: Further comprising a tubular extending into the wellbore in the subterranean salt formation, and a pump fluidly coupled to the tubular; and wherein step (g) is performed by introducing the final cement slurry into the wellbore through the tubular.

By way of non-limiting example, exemplary combinations applicable to Embodiment B include: B with B1, B2, and B11; B with B3, B 5, B7, and B9; B with B1 and B4; B with B1, B2, B3, B4, B5, B6, B7, B8, B9, B10, and B11; B with B5, B9, and B10; B with B1, B4, B6, and B11; and the like.

Therefore, the embodiments disclosed herein are well adapted to attain the ends and advantages mentioned as well as those that are inherent therein. The particular embodiments disclosed above are illustrative only, as they may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
designing a proposed cement slurry based on an experimentally determined salt creep profile for a single salt at a first location in a wellbore in a subterranean salt formation;
experimentally determining whether the proposed cement slurry is capable of forming a wellbore load resistant cement sheath at the first location based on actual thermal and thermo-mechanical properties of the proposed cement slurry;
theoretically determining whether the proposed cement slurry is capable of forming the wellbore load resistant cement sheath at the first location, the theoretical determination comprising: designing an electronic, cross-section geometric model of the subterranean salt formation at the first location, wherein the geometric model represents the subterranean salt formation, a casing, and the proposed cement slurry after curing, and
simulating a plane-strain condition of wellbore loads on the cured proposed cement slurry at the first location in the subterranean formation using the geometric model; and
establishing a final cement slurry capable of forming the wellbore load resistant cement sheath based on the experimental and theoretical determinations.

2. The method of claim 1, further comprising experimentally determining the salt creep profile by performing at least one of: obtaining at least one wellbore core sample of the wellbore in the subterranean formation at the first location, and performing a core sample salt creep load measurement using the wellbore core sample, performing a downhole salt creep load measurement at the first location in the wellbore in the subterranean formation, and obtaining an offset well salt creep load measurement and performing a parametric analysis thereon, wherein the offset well and the wellbore in the subterranean salt formation are located in a same oil field.

3. The method of claim 1, wherein experimentally determining whether the proposed cement slurry is capable of forming the wellbore load resistant cement sheath comprises performing at least one of: curing the proposed cement slurry, and performing an ultrasonic cement analyzer test on the cured proposed cement slurry, and curing the proposed cement slurry, and performing uniaxial and triaxial compression tests on the cured proposed cement slurry.

4. The method of claim 1, wherein simulating the plane-strain condition of the wellbore loads comprises simulating the plane-strain condition of wellbore loads based on the wellbore loads and one or both of: theoretical thermal and thereto-mechanical properties of the cured proposed cement slurry, or the actual thermal and thereto-mechanical properties of the cured proposed cement slurry.

5. The method of claim 4, wherein theoretically determining whether the proposed cement slurry is capable of forming the wellbore load resistant cement sheath comprises: simulating the plane-strain condition of wellbore loads based on the theoretical thermal and thereto-mechanical properties before experimentally determining whether the proposed cement slurry is capable of forming a wellbore load resistant cement sheath, and simulating the plane-strain condition of wellbore loads based on the actual thermal and thereto-mechanical properties after experimentally determining whether the proposed cement slurry is capable of forming a wellbore load resistant cement sheath.

6. The method of claim 1, further comprising: providing the wellbore in the subterranean salt formation; experimentally determining the salt creep profile for the single salt at the first location in the wellbore in the subterranean formation; and performing a final cementing operation with the final cement slurry in the subterranean salt formation.

7. The method of claim 1, further comprising: manipulating the proposed cement slurry after experimentally determining whether the proposed cement slurry is capable of forming the wellbore load resistant cement sheath; and repeating the experimental and theoretical determinations until the proposed cement slurry is the final cement slurry that is capable of forming the wellbore load resistant cement sheath.

8. The method of claim 1, further comprising: manipulating the proposed cement slurry after theoretically determining whether the proposed cement slurry is capable of forming the wellbore load resistant cement sheath; and repeating the experimental and theoretical determinations until the proposed cement slurry is the final cement slurry that is capable of forming the wellbore load resistant cement sheath.

9. The method of claim 1, further comprising introducing the final cement slurry into the wellbore through a tubular extending into the wellbore with a pump fluidly coupled to the tubular.

10. A method comprising:
designing a proposed cement slurry based on an experimentally determined salt creep profile for intercalated salts along a first length of a wellbore in a subterranean salt formation; experimentally determining whether the proposed cement slurry is capable of forming a wellbore load resistant cement sheath along the first length based on actual thermal and thermo-mechanical properties of the proposed cement slurry;
theoretically determining whether the proposed cement slurry is capable of forming the wellbore load resistant cement sheath along the first length, the theoretical determination comprising: designing an electronic, longitudinal geometric model of the subterranean salt formation along the first length, wherein the geometric model represents the subterranean salt formation, a casing, and the proposed cement slurry after curing, and
simulating an axisymmetric condition or a three-dimensional condition of wellbore loads on the cured proposed cement slurry along the first length in the subterranean salt formation using the geometric model; and
establishing a final cement slurry capable of forming the wellbore load resistant cement sheath based on the experimental and theoretical determinations.

11. The method of claim 10, further comprising experimentally determining the salt creep profile by performing at least one of: obtaining at least one wellbore core sample of the wellbore in the subterranean salt formation at the first length, and performing a core sample salt creep load measurement using the wellbore core sample, performing a downhole salt creep load measurement at the first length in the wellbore in the subterranean salt formation, and obtaining an offset well salt creep load measurement and performing a parametric analysis thereon, wherein the offset well and the wellbore in the subterranean salt formation are located in a same oil field.

12. The method of claim 10, wherein experimentally determining whether the proposed cement slurry is capable of forming the wellbore load resistant cement sheath comprises performing at least one of: curing the proposed cement slurry, and performing an ultrasonic cement analyzer test on the cured proposed cement slurry, and curing the proposed cement slurry, and performing uniaxial and triaxial compression tests on the cured proposed cement slurry.

13. The method of claim 10, wherein simulating the axisymmetric condition or the three-dimensional condition of the wellbore loads comprises simulating the axisymmetric condition or the three-dimensional condition based on the wellbore loads and one or both of: theoretical thermal and thereto-mechanical properties of the cured proposed cement slurry, or the actual thermal and thereto-mechanical properties of the cured proposed cement slurry.

14. The method of claim 13, wherein theoretically determining whether the proposed cement slurry is capable of forming the wellbore load resistant cement sheath comprises: simulating the axisymmetric condition or the three-dimensional condition of the wellbore loads based on the theoretical thermal and thereto-mechanical properties before experimentally determining whether the proposed cement slurry is capable of forming the wellbore load resistant cement sheath; and simulating the axisymmetric condition or the three-dimensional condition of the wellbore loads based on the actual thermal and thereto-mechanical properties after experimentally determining whether the proposed cement slurry is capable of forming the wellbore load resistant cement sheath.

15. The method of claim 10, wherein the electronic, longitudinal geometric model is a three-dimensional model.

16. The method of claim 10, further comprising: providing the wellbore in the subterranean salt formation; experimentally determining the salt creep profile for the intercalated salts along the first length of the wellbore in the subterranean salt formation; and performing a final cementing operation with the final cement slurry in the subterranean salt formation.

17. The method of claim 10, further comprising: manipulating the proposed cement slurry after experimentally determining whether the proposed cement slurry is capable of forming the wellbore load resistant cement sheath; and repeating the experimental and theoretical determinations until the proposed cement slurry is the final cement slurry that is capable of forming the wellbore load resistant cement sheath.

18. The method of claim 10, further comprising: manipulating the proposed cement slurry after theoretically determining whether the proposed cement slurry is capable of forming the wellbore load resistant cement sheath; and repeating the experimental and theoretical determinations until the proposed cement slurry is the final cement slurry that is capable of forming the wellbore load resistant cement sheath.

19. The method of claim 10, further comprising designing another proposed cement slurry based on an experimentally determined salt creep profile for intercalated salts along a second length of the wellbore in the subterranean salt formation; experimentally determining whether the another proposed cement slurry is capable of forming a wellbore load resistant cement sheath along the second length based on actual thermal and thermo-mechanical properties of the another proposed cement slurry; theoretically determining whether the another proposed cement slurry is capable of forming the wellbore load resistant cement sheath along the second length, the theoretical determination comprising: designing the electronic, longitudinal geometric model of the subterranean salt formation along the second length, and simulating an axisymmetric condition or a three-dimensional condition of wellbore loads on the cured proposed cement slurry along the second length in the subterranean salt formation using the geometric model, wherein the electronic, longitudinal geometric model represents the subterranean salt formation, the casing, and the proposed cement slurry after curing along the first length and the second length.

20. The method of claim 10, further comprising introducing the final cement slurry into the wellbore through a tubular extending into the wellbore.

* * * * *